Nov. 16, 1965
HIROYUKI TAKAI
3,218,485
SAFETY DEVICE FOR A SMALL-SIZE, ELECTRICALLY-DRIVEN
WINDING AND PULLING APPARATUS OR THE LIKE
Filed Aug. 28, 1962
Fig. 1
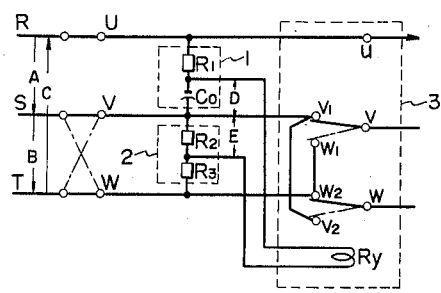
Fig. 3
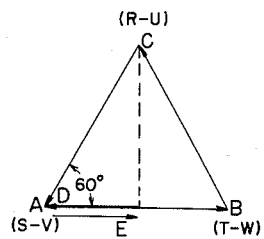
Fig. 2
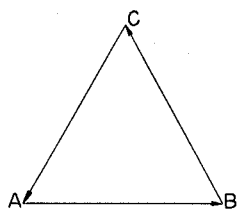
Fig. 4
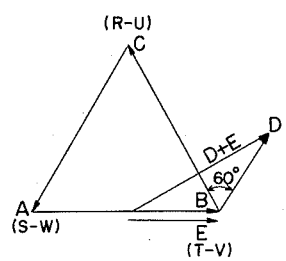
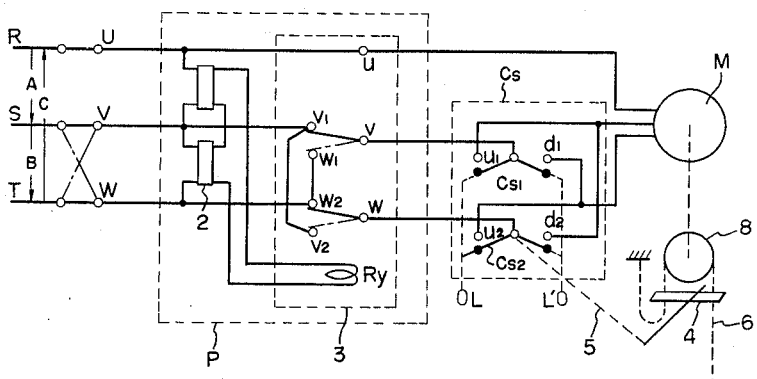
Fig. 5
INVENTOR.
HIROYUKI TAKAI
BY McGlew and Toren
ATTORNEYS

United States Patent Office 3,218,485
Patented Nov. 16, 1965

3,218,485
SAFETY DEVICE FOR A SMALL-SIZE, ELECTRICALLY-DRIVEN WINDING AND PULLING APPARATUS OR THE LIKE
Hiroyuki Takai, Kawasaki-shi, Kanagawa-ken, Japan, assignor to Kabushiki Kaisha Kito Seisakusho, Kanagawa-ken, Japan
Filed Aug. 28, 1962, Ser. No. 219,992
Claims priority, application Japan, Apr. 10, 1962, 37/13,631
5 Claims. (Cl. 307—127)

The present invention relates to a safety device for a small-size, electrically-driven winding and pulling apparatus or the like, consisting of a combination of a phase shifter connected across one phase or two lines of a three-phase power source, a voltage dividing circuit and a relay which, under a potential which is the vectorial sum of the output voltage of said phase shifter and a voltage proportional to another phase or line voltage, as derived by said voltage dividing circuit, operates as a phase-rotation change-over switch.

Such electrically-driven apparatus has hitherto not been provided with a phase sequence correcting safety device, so that accidents, such as breaking-down of the main body of the apparatus, cutting-off the chain tied around a package, etc. occur so frequently, because the wrong phase sequence connection between the power source and said apparatus causes limit switches not to function properly to prevent excessive upward and downward windings.

It is also known that a small-size, multi-phase induction motor can be used for the detection of the phase sequence of the power source, namely in this case a phase-rotation change-over switch is actuated by the torque of said motor. However, the cost of manufacturing such a motor is comparatively higher, and besides it is somewhat difficult technically to use the motor in a locked condition and to make it as small as possible.

The main object of the present invention is to obtain a safety device of the above-mentioned type which can be manufactured without much difficulty and be operated without any fault enumerated above.

In order to attain this object, according to the present invention, a relay energized by a potential which is the vectorial sum of the output voltage of a phase shifter connected across one phase or two lines of a three-phase power source, and a voltage proportional to another phase or line voltage, as derived by said voltage dividing circuit, operates as a phase-rotation change-over switch in such a manner that the power, the phase rotation of which is always normal, irrespective of the way of connecting between the power source and the electrically-driven apparatus, can be supplied to said apparatus, and the apparatus can be prevented from breaking-down which would be caused by a wrong phase sequence connection.

The present invention is explained by way of an embodiment thereof, with reference to the accompanying drawing, wherein FIG. 1 is a wiring diagram for the safety device of the present invention;

FIG. 2 is a vector diagram showing three-phase voltage;

FIG. 3 and FIG. 4 are also vector diagrams which respectively show the voltage of each part of the safety device in FIG. 1;

FIG. 5 is a wiring diagram for the safety device of the present invention, especially arranged for an electrically-driven hoist.

In FIG. 1, 1 indicates a phase shifter, which is to shift the phase of the line voltage between terminals U and V, and comprises a resistance $R_1$ and a condenser $C_o$. A voltage dividing circuit is designated by 2 and consists of resistances $R_2$ and $R_3$. The line voltage between terminals V and W can be divided by this circuit. A relay 3 is operated by a potential equal to the vectorial sum of the output voltage of the phase shifter 1 and the voltage proportional to the line voltage between terminals V and W. Movable contacts $v$, $w$ of the relay are operated by the winding $Ry$ of the relay. When the relay 3 is de-energized or dropped, fixed contacts $v_1$, $w_2$ are respectively engaged with movable contacts $v$, $w$, while fixed contacts $v_2$, $w_1$ are respectively engaged with movable contacts $v$, $w$ when the relay is energized or picked up. Fixed contacts $v_1$, $v_2$ are connected with the terminal V, and fixed contacts $w_1$, $w_2$ are connected with the terminal W. $u$ indicates a relaying terminal, which is connected with the terminal U.

When the output voltage D of the phase shifter 1 (FIG. 3) is selected so as to be 60 degrees behind the line voltage between terminals U and V, the magnitude of the output voltage D is equal to a half of that of said line voltage. Resistances $R_2$ and $R_3$ of the voltage dividing circuit are equalized, so that the output voltage E of said circuit is also half as much as the line voltage between terminals V and W.

Three terminals of the power source are designated by R, S and T, respectively. The voltage A between R and S, the voltage B between S and T, and the voltage C between T and R are vectors shown in FIG. 2.

Now, those terminals R, S and T are respectively connected with terminals U, V and W of the safety device of the present invention. The line voltage between U and V is designated by A; that between V and W is B; that between W and U is C. The output voltage D of the phase shifter 1 and the output voltage E of the voltage dividing circuit 2 are therefore, shown as vectors in FIG. 3. In case the three-phase A.C. voltage of the power source is balanced, those vectors are summed up to zero and no voltage is impressed on the winding $Ry$. Accordingly the relay 3 is not energized, and so the power is supplied to the motor attached to the electrically-driven apparatus through terminals $u$, $v$ and $w$ over connections U–$u$, V–$v_1$–$v$ and W–$w_2$–$w$.

Next, in case of connections R–U, S–W and T–V, as shown in dotted and broken lines in FIG. 1, the line voltage A is impressed between U and W, B between W and V, and C between V and U. Those voltages are in vectors as shown in FIG. 4, where the output voltage D of the phase shifter 1 is 60 degrees behind the line voltage C and is half as much as said voltage C, and the voltage E is also half as much as the line voltage B. In case, therefore, the three-phase A.C. voltage of the power source is balanced, the combined voltage of D and E is $\sqrt{3/2}$ times as much as the line voltage. This combined voltage is impressed on the winding $Ry$ of the relay 3, which is then operated.

In this case, contacts of the relay 3 are connected as $w_1$–$v$, $v_2$–$w$, and so the connections between the power source and the electrically-driven apparatus are indicated by R–U–$u$, S–W–$w_1$–$v$ and T–V–$v_2$–$w$. As will appear from the foregoing, the phase rotation in this case is the same as that in case of connections R–U, S–V and T–W, shown in FIG. 1. Accordingly the motor attached to said apparatus rotates in the same direction as with the connections R–U, S–V, and T–W shown in FIG. 1.

FIG. 5 shows an embodiment of the safety device of the present invention, where the device is especially applied to an electrically driven hoist. The safety device is here indicated by P, and the same reference characters as in FIG. 1 are used to indicate the corresponding parts.

In this case, the terminal $u$ of the relay 3 is directly connected with the motor M, while the other terminals $v$, $w$ are respectively connected with the switching contact pieces $Cs_1$, $Cs_2$ of a controller $Cs$. In order to operate the hoist 8 in a normal direction, namely in an upward-winding of the chain, each contact piece $Cs_1$ and $Cs_2$ is engaged with a contact $u_1$, $u_2$, respectively, connected to motor M, by pulling down a handle L'. Thereby the connections $v-u_1$ and $w-u_2$ are effected. To operate the hoist 8 in the reverse direction, namely in a downward or unwinding direction of the chain, the contact pieces $Cs_1$ and $Cs_2$ are engaged with contacts $d_1$ and $d_2$, respectively, connected to motor M, by pulling down a handle L. Thereby, the connections $v-d_1$ and $w-d_2$ are effected. Therefore, it is possible to cause the motor M to rotate in a desired direction.

In case of an excessive downward-winding of the chain 6, the loop made by the chain causes a limit lever 4 to turn in a clockwise direction, which, by means of a connecting-rod 5, disengages switching pieces $Cs_1$, $Cs_2$ from contacts $d_1$, $d_2$. As a result, the motor M stops the rotation.

In case of an excessive upward-winding of the chain 6, the hook 7 runs against the lever 4, which turns in an anti-clockwise direction and at the same time releases switching pieces $Cs_1$, $Cs_2$ from contacts $u_1$, $u_2$ through the connecting rod 5. This causes the motor M to stop the rotation. It is very important that terminals of the relay 3, the controller Cs and the motor M are connected in such a way that the above operations can be performed.

Phase shifters different in detail from the foregoing may obtain the same effect as that of the phase shifter shown in FIG. 1. Thus, other types of the voltage dividing circuits may be used, provided that the voltage produced by each of them is approximately equal to the output voltage of the phase shifter. Especially, when the output voltage of the phase shifter is almost equal to the line voltage, the voltage dividing circuit may be left out. Furthermore, even in case the voltage produced by the phase shifter has an an angle of lead, the same object as the above-mentioned can be likewise obtained.

Since the relay works only when the voltage impressed on the winding exceeds a predetermined value derived from the characteristics, the operations described in the above embodiment are fully carried out even if the degree of phase shift of the phase shifter and the voltage-dividing ratio differ to a certain degree from those stated in the example.

From the foregoing, it is clear that the safety device of the present invention consists of a simple combination of the phase shifter, the voltage dividing circuit and the relay which works as the phase-rotation change-over switch, and that the motor attached to the electrically driven apparatus can be turned without fail in a desired direction, irrespective of the connection between the power source and the safety device. Therefore, various accidents due to the unexpected reverse rotation of the motor can be prevented, and also the manufacturing of the safety device can be easier than the conventional type of the safety device using a small-size multi-phase induction motor.

Having thus described the invention, what is claimed as new and desired to be secured by Letters Patent, is:

1. A safety device for use for a three-phase electrical system comprising, in combination, first, second and third input terminals and first, second and third load terminals; a reversing switch device connected between the input and load terminals and having a first position wherein it connects the first, second and third input terminals with the first, second and third load terminals, respectively, and a second position wherein it connects the second, first and third input terminals with the first, second and third load terminals, respectively; a relay coil operable, when energized, to actuate said reversing switch device to said second position; a phase shifter connected across a pair of said input terminals in advance of said reversing switch device; and circuit means operable to apply across said relay coil the vectorial sum of a first voltage, which is the output voltage of said phase shifter, and a second voltage, which is proportional to the voltage across another pair of said input terminals; said first and second voltages substantially neutralizing each other at said relay coil when the voltages at said input terminal are in one phase sequence, and adding, to energize said relay coil, when the voltages at said input terminals are in the other phase sequence.

2. A safety device for use for a three-phase electrical system comprising, in combination, first, second and third input terminals and first, second and third load terminals; a reversing switch device connected between the input and load terminals and having a first position wherein it connects the first, second and third input terminals with the first, second and third load terminals, respectively and a second position wherein it connects the second, first and third input terminals with the first, second and third load terminals, respectively; a relay coil operable, when energized, to actuate said reversing switch device to said second position; a phase shifter connected across a pair of said input terminals in advance of said reversing switch device; a voltage divider connected across another pair of said input terminals in advance of said reversing switch device; circuit means operable to apply, across said relay coil, the vectorial sum of a first voltage, which is the output voltage of said phase shifter, and a second voltage, which is derived from said voltage divider, which is substantially equal to the output voltage of said phase shifter, and which is proportional to the voltage across said other pair of said input terminals; said first and second voltages substantially neutralizing each other when the voltages at said input terminals are in one phase sequence, and adding, to energize said relay coil, when the voltages at said input terminals are in the other phase sequence.

3. A safety device for use for a three-phase electrical system comprising, in combination, first, second and third input terminals and first, second and third load terminals; a reversing switch device connected between the input and load terminals and having a first position wherein it connects the first, second and third input terminals with the first, second and third load terminals, respectively, and a second position wherein it connects the second, first and third input terminals with the first, second and third load terminals, respectively; a relay coil operable, when energized, to actuate said reversing switch device to said second position; a phase shifter connected across a pair of said input terminals in advance of said reversing switch device; means operable to derive a first voltage which is the output voltage of said phase shifter; means operable to derive a second voltage, substantially equal to the output voltage of said phase shifter, and proportional to the voltage across another pair of said input terminals; means operable to apply the vectorial sum of said first and second voltages to said relay coil; said first and second voltages substantially neutralizing each other at the relay coil when the voltages at said input terminals are in one phase sequence, and adding, to energize said relay coil, when the voltages at said input terminals are in the other phase sequence.

4. A safety device for use with a three-phase electrical system, as claimed in claim 2, in which said voltage divider comprises a pair of resistors connected across said other pair of terminals, said second voltage being tapped from the junction of said resistors.

5. A safety device for use with a three-phase electrical system, as claimed in claim 2, in which said phase shifter comprises a resistor and a capacitor connected in series across said first-mentioned pair of input terminals; the output voltage of said phase shifter being derived from the junction point of said resistor and said capacitor.

References Cited by the Examiner

UNITED STATES PATENTS 2,724,782  11/1955  Holloway _____ 307—127

LLOYD McCOLLUM, *Primary Examiner.*